(12) United States Patent
Schlanzke et al.

(10) Patent No.: US 10,207,732 B2
(45) Date of Patent: Feb. 19, 2019

(54) STEERING COLUMN SWITCH FOR A MOTOR VEHICLE

(71) Applicant: Leopold Kostal GmbH & Co. KG, Luedenscheid (DE)

(72) Inventors: Benjamin Schlanzke, Luedenscheid (DE); Klaus Hirschfeld, Luedenscheid (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 129 days.

(21) Appl. No.: 15/628,786

(22) Filed: Jun. 21, 2017

(65) Prior Publication Data

US 2017/0282959 A1 Oct. 5, 2017

Related U.S. Application Data

(63) Continuation of application No. PCT/EP2016/050527, filed on Jan. 13, 2016.

(30) Foreign Application Priority Data

Jan. 14, 2015 (DE) .................. 10 2015 000 419

(51) Int. Cl.
*B60Q 1/40* (2006.01)
*B62D 1/184* (2006.01)
(Continued)

(52) U.S. Cl.
CPC ........... *B62D 1/184* (2013.01); *B60Q 1/1469* (2013.01); *B60Q 1/40* (2013.01); *E05B 47/004* (2013.01); *E05B 47/0696* (2013.01)

(58) Field of Classification Search
CPC ...... B60Q 1/1469–1/1476; B60Q 1/40–1/425; Y10T 74/20146–74/20152
See application file for complete search history.

(56) References Cited

U.S. PATENT DOCUMENTS

| 2,535,384 A | 12/1950 | Batt |
| 9,327,635 B2 | 5/2016 | Scheck et al. |
| 2015/0035669 A1 | 2/2015 | Scheck et al. |

FOREIGN PATENT DOCUMENTS

| DE | 1221339 A | 7/1966 |
| DE | 7537002 U | 4/1978 |

(Continued)

OTHER PUBLICATIONS

The International Bureau of WIPO, International Preliminary Report on Patentability for the International Application No. PCT/EP2016/050527, dated Jul. 18, 2017.
(Continued)

*Primary Examiner* — Ramon M Barrera
(74) *Attorney, Agent, or Firm* — Brooks Kushman P.C.

(57) ABSTRACT

A steering column switch for a vehicle includes a switching lever that operates by pivoting in relation to a housing. The lever has a locking pin which assumes a stable position on a switching gate when the lever is not operated and is guided into an unstable position by operation of the lever. The switching gate guides the pin back into the stable position when operation of the lever ceases. A permanent magnet on a body of the lever is brought against an electromagnet on the housing by pivoting the lever into the unstable position. The lever is held in the unstable position by magnetic attraction between the magnets for a time in which a function associated with the lever being actuated into the unstable position is active. Afterwards, the electromagnet produces a counter magnetic field which interrupts the magnetic attraction so that the lever returns to the stable position.

10 Claims, 2 Drawing Sheets

(51) Int. Cl.
*B60Q 1/14* (2006.01)
*E05B 47/00* (2006.01)
*E05B 47/06* (2006.01)

(56) References Cited

FOREIGN PATENT DOCUMENTS

| | | | |
|---|---:|---|---|
| DE | 2849686 | A1 | 5/1980 |
| DE | 19918566 | A1 | 10/2000 |
| DE | 10039135 | A1 | 2/2002 |
| DE | 102004004366 | A1 | 9/2005 |
| DE | 102006052108 | A1 | 7/2008 |
| DE | 102008037080 | A1 | 2/2010 |
| DE | 102012203095 | A1 | 9/2013 |
| EP | 1177942 | A2 | 2/2002 |
| JP | S608134 | A | 1/1985 |
| JP | 20040014328 | A | 1/2004 |
| RU | 149217 | U1 | 12/2014 |

OTHER PUBLICATIONS

European Patent Office, International Search Report for International Application No. PCT/EP2016/050527, dated Apr. 5, 2016.
German Patent Office, German Search Report for the corresponding German Patent Application No. 10 2015 000 419.0, dated Aug. 31, 2015.

STEERING COLUMN SWITCH FOR A MOTOR VEHICLE

CROSS-REFERENCE TO RELATED APPLICATIONS

This application is a continuation of International Application No. PCT/EP2016/050527, published in German, with an International filing date of Jan. 13, 2016, which claims priority to DE 10 2015 000 419.0, filed Jan. 14, 2015; the disclosures of which are hereby incorporated in their entirety by reference herein.

TECHNICAL FIELD

The present invention relates to a steering column switch for a motor vehicle, the steering column switch having a switching lever and a switching lever housing, the switching lever being actuatable (e.g., operable) by means of pivoting with respect to the housing, the switching lever having a locking pin that is guided on a switch gate, the locking pin assumes a stable switch position on the switch gate when the switching lever is not actuated, the locking pin is guided on the switch gate into an unstable switch position when the switching lever is actuated, and the switch gate returns or guides the locking pin back from the unstable switch position into the stable switch position after actuation of the switching lever is discontinued.

BACKGROUND

Steering column switches are provided in motor vehicles for controlling a wide range of functions. Typical applications for steering column switches include turn signal indicators, vehicle lighting, low/high beam switching, flashers, and windshield wiper/washer control. Steering column switches are sometimes actuated by rotation about a longitudinal axis, but generally are actuated by pivoting with respect to a switching lever housing.

A distinction may be made between steering column switches that switch by locking or touching ("pushbutton function") depending on whether the switching lever, after pivoting, maintains its switch position until it is returned manually or by a reset device, or is immediately returned to its stable starting position after the actuation is completed. For example, steering column switches for turn signal indicators, referred to herein as blinker switches, usually have three switch positions. The middle switch position may be stably assumed by the switching lever. The middle switch position does not activate a turn signal indicator. The other two switch positions respectively correspond to left-turn and right-turn signal indicators.

Blinker switches have been in use for some time in which the switching lever is held in a stable position in either of two switch positions. The two switch positions correspond respectively to a travel direction to the right and a travel direction to the left. The switching lever is held stably in either of the two switch positions by, for example, a detent cam mechanism. After a turn is completed, a mechanical release device coupled to the vehicle steering system releases the switching lever from the locked switch position. The switching lever is thus caused to be pushed back into a neutral central position.

Recent designs of blinker switches often detect the deflection of the switching lever to the right or left as a push switch in each case. Actuation of the turn signal indicators for the associated side of the vehicle is correspondingly started via an electronics system. After a deflection is actuated, the switching lever automatically returns to its central position. The actuation of the blinkers is stopped by an electrical signal from the steering column after a turn is completed. Due to dispensing with a mechanically achieved resetting of the switching lever, the mechanical design of these steering column switches and the mechanical design of the steering column are greatly simplified compared to the design mentioned above.

A general drawback of a touch-actuated steering column switch is that the switching state of the switching function thus actuated is no longer recognizable based simply on the switching lever position. This results in a lack of visual or haptic feedback. As such, for many users the actuation of the switch is not perceived to be intuitively detectable.

SUMMARY

An object includes, for a steering column switch that implements one or more electrical touch functions by means of a switch gate, a switching lever mechanism in which the set switching state is recognizable based on the switching lever position and in which the switching lever may be easily transferred to a neutral position.

In carrying out at least one of the above and/or other objects, a steering column switch is provided. The steering column switch includes a steering column switch for a vehicle. The steering column switch includes a housing having a switch gate; a switching lever; a switch body having a permanent magnet; and an electromagnet. The switching lever is actuatable by pivoting with respect to the housing. The switching lever has a locking pin guided on the switch gate. The locking pin assumes a stable switch position on the switch gate when the switching lever is not actuated. The locking pin is guided into an unstable switch position by actuating the switching lever. The switch gate is configured to return the locking pin from the unstable switch position into the stable switch position after actuation of the switching lever is discontinued. The switch body is connected to the switching lever to pivot with the switching lever in relation to the housing. The electromagnet is fixed within the housing and has a magnetic retaining element. The permanent magnet is brought against the magnetic retaining element by pivoting the switching lever into the unstable switch position and the switching lever is held in the unstable switch position for a period, during which a function associated with the switching lever being actuated into the unstable position is active, by magnetic attraction between the permanent magnet and the electromagnet. Upon expiration of the period the electromagnet is controlled into a switched-on state to generate an opposing magnetic field interrupting the magnetic attraction between the permanent magnet and the electromagnet so that the switching lever is returned by the switch gate from the unstable switch position back to the stable switch position.

The steering column switch may further include a magnetic sensor fixed to a part of the housing. The magnetic sensor is configured to generate an output signal as a function of a position of the permanent magnet relative to the part of the housing.

The magnetic retaining element may include a ferromagnetic material. The magnetic retaining element may be a permanent magnet. The magnetic retaining element may be a coil core of the electromagnet.

An embodiment provides a steering column switch for a motor vehicle. The steering column switch includes a switching lever and a switching lever housing ("housing").

The switching lever can be operated by means of pivoting in relation to the housing. The switching lever has a locking pin that is guided on a switch gate. The locking pin assumes a stable position on the switch gate when the switching lever is not operated (i.e., not pivoted). The locking pin can be guided into at least one unstable switching position by operation (i.e., pivoting) of the switching lever. The switch gate is configured to guide or return the locking pin back into the stable switching position from any unstable switching position after operation of the switching lever ceases.

The steering column switch further includes a switch cradle ("switch body"). The switch body is connected to the switching lever to pivot with the switching lever in relation to the housing. The switching lever and the switch body pivot together in relation to the housing when the switching lever is operated (i.e., when the switching lever is pivoted). The switch body has a permanent magnet arranged thereon. The steering column switch further includes an electromagnet fixed in place within the housing. The electromagnet includes a magnetic retaining element.

The permanent magnet arranged on the switch body is brought against the magnetic retaining element of the electromagnet when the switching lever is pivoted into an unstable position. The switching lever is held in the unstable position by magnetic attraction between the permanent magnet and the electromagnet. That is, the magnetic attraction between the permanent magnet and the electromagnet is what causes the switching lever to be held in the unstable position. Otherwise, in the absence of the magnetic attraction between the permanent magnet and the electromagnet the switching lever would return from the unstable position back into the stable position. The switching lever would return from the unstable position back into the stable position as the switch gate is configured to guide or return the locking pin of the switching lever back into the stable position.

The switching lever is held in the unstable position for the time in which a function associated with the switching lever being actuated into the unstable position is active. Afterwards, the electromagnet is controlled into a switched-on state to produce a counter magnetic field to the magnetic field of the permanent magnet. Consequently, the magnetic attraction between the permanent magnet and the electromagnet is interrupted with the permanent magnet being repelled from electromagnet and the switching lever being automatically returned or guided from the unstable position back into the stable position.

In embodiments, the switch body together with the switching lever is pivotable with respect to the switching lever housing, at least one permanent magnet is situated on the switch body and is brought against a magnetic retaining element of an electromagnet fixed to the housing by pivoting the switching lever into an unstable switch position, and the electromagnet in a switched-on state generates an opposing field to the magnetic field of the permanent magnet.

A steering column switch in accordance with the embodiments thus provides the combination of a switching lever, guided in a monostable manner on a switch gate, with a magnetic device for holding the switching lever in an unstable position and releasing the switching lever from the unstable position to return to a stable position.

The magnetic device includes a switch body, which is pivotable on the switching lever housing and has one or more permanent magnets, and an electromagnet situated on the housing. The stated elements, with a relatively simple design, may be added to a customary steering column switch having a touch function mechanism.

The magnetic retaining element may be implemented by a ferromagnetic or permanent magnetic member. For instance, the magnetic retaining element may be provided by the magnetic core (i.e., bobbin) of the electromagnet.

A steering column switch in accordance with the embodiments may further include one or more magnetic sensors. The magnetic sensors are respectively associated with the permanent magnets. The magnetic sensors are respectively fixedly positioned on housing parts of the housing at sensor locations adjacent to the portions of the switch body on which the associated permanent magnets are arranged. The magnetic sensors are configured to detect magnetic field strengths of the associated permanent magnets. By evaluating the output signal of a magnetic sensor, the location of the switch body relative to the sensor location at a housing part and thus the switch position of the switching lever may be detected. Via the magnetic sensor output, the switch position of the switching lever is detected in a contactless manner. As such, the use of conventional mutually contacting switching contacts, which are thus subject to wear, may be dispensed with.

BRIEF DESCRIPTION OF THE DRAWINGS

An exemplary embodiment of a steering column switch in accordance with the present the invention is explained and illustrated below referring to the drawings, which show the following.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of components. Therefore, specific structural and functional details disclosed herein are not to be interpreted as limiting, but merely as a representative basis for teaching one skilled in the art to variously employ the present invention.

Figure 1:
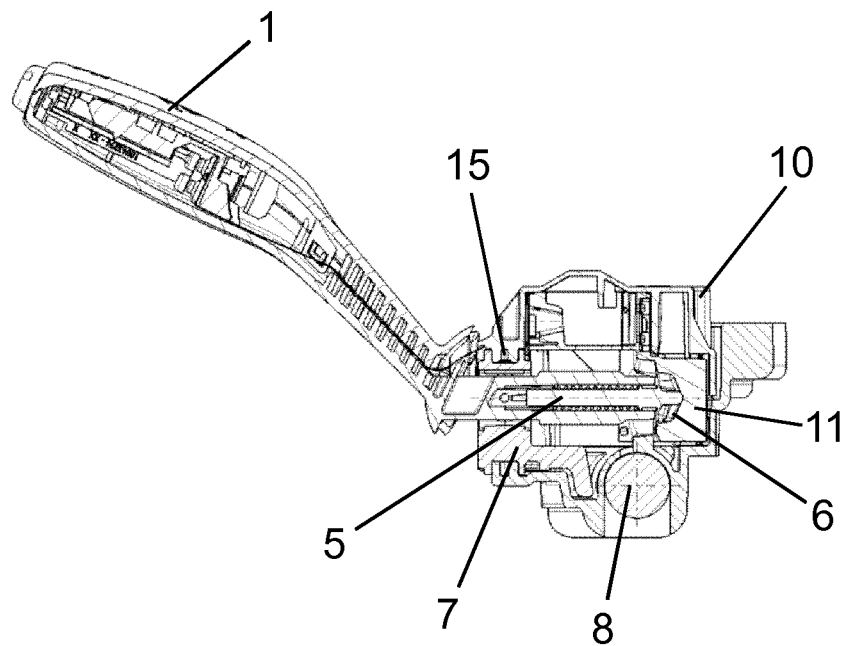
FIG. 1 illustrates a sectional view of the steering column switch.

Referring now to FIG. 1, a sectional view of a steering column switch in accordance with an exemplary embodiment is shown. The steering column switch includes a switching lever 1 and a switching lever housing ("housing") 10. Switching lever 1 is pivotably supported about a pivot axis 15 held on housing 10 as an actuating element. A locking pin 5 is coupled to switching lever 1.

A switch cradle ("switch body") 7 is mechanically coupled to switching lever 1. Switch body 7 is also pivotable about pivot axis 15. Switch body 7 pivots about pivot axis 15 with the same pivot motion as switching lever 1 as the switching lever pivots about the pivot axis.

A switch gate 11 is within housing 10. Pivoting of switching lever 1 about pivot axis 15 moves locking pin 5 along a contour 6 of switch gate 11. The pivoting of switching lever 1 about pivot axis 15 also causes switch body 7 to pivot about the pivot axis.

Switching lever 1 in an unactuated central position occupies a stable locking position on contour 6 of switch gate 11. From this central position, first and second deflected positions (i.e., first and second actuated positions) are settable in which locking pin 5 is moved from the central position to the front (e.g., the first deflected position) or the rear (e.g., the second deflected position), in relation to the plane of the drawing. The deflected positions (i.e., the actuated positions) are not stable. That is, the deflected positions are unstable. This means that switching lever 1 automatically returns to the unactuated central position by contour 6 of switch gate 11 after the switching lever is released. That is, switching lever 1 and switch gate 11 are configured so that the switching lever automatically returns from either unstable position to the unactuated central position upon actuation of the switching lever being discontinued. The switching lever automatically returning from an actuated position to the unactuated central position corresponds to a tapping actuation of switching lever 1 or a touch activation of electrical switching elements (not shown).

A tapping actuation of switching lever 1 is sufficient for starting an electrically controlled switching function. However, it has the disadvantage that the set switching state is not haptically perceptible and is not visually detectable from the position of the switching lever. A similar problem as with the blinker switches, described at the outset, also arises for touch-actuated steering column switches that control the windshield wiper system of a motor vehicle. In these types of steering column switches, for example, at times it is not apparent whether the windshield wipers are in the pause state of an interval operation or are completely switched off. This uncertainty may be irritating for the user.

The steering column switch is therefore configured so that switching lever 1 after being actuated to move into an actuating position (i.e., an unstable switch position) is held to be set in the actuating position for the period in which the selected function is to be active. The steering column switch is further configured so that switching lever 1, upon the period expiring, is reset to its stable starting position. That is, upon expiration of the period in which the selected function is to be active and during which switching lever 1 is held set in an actuating position, the steering lever is released from being held set in the actuating position. The releasement of steering lever 1 enables the steering lever to move from the actuating position to the stable starting position. Steering lever 1 thus moves from the actuating position to the stable position as switch gate 11 guides locking pin 5 from the actuating position to the stable position.

The resetting of switching lever 1 from the actuating position to the stable position does not take place via an external mechanical reset device. Instead, the steering column switch is configured so that the resetting of switching lever 1 takes place by electrical control. The electrical control may be based on an electrical signal that is preferably automatically generated.

Thus, for a blinker switch, for example via a signal derived from a simple control movement of the steering wheel, the blinking of the directional signal lights after a turning operation is automatically ended and the steering column switch is also reset into its starting position. Such a simple control movement of the steering wheel is typically detected in motor vehicles by an electronic sensor system.

Figure 2:
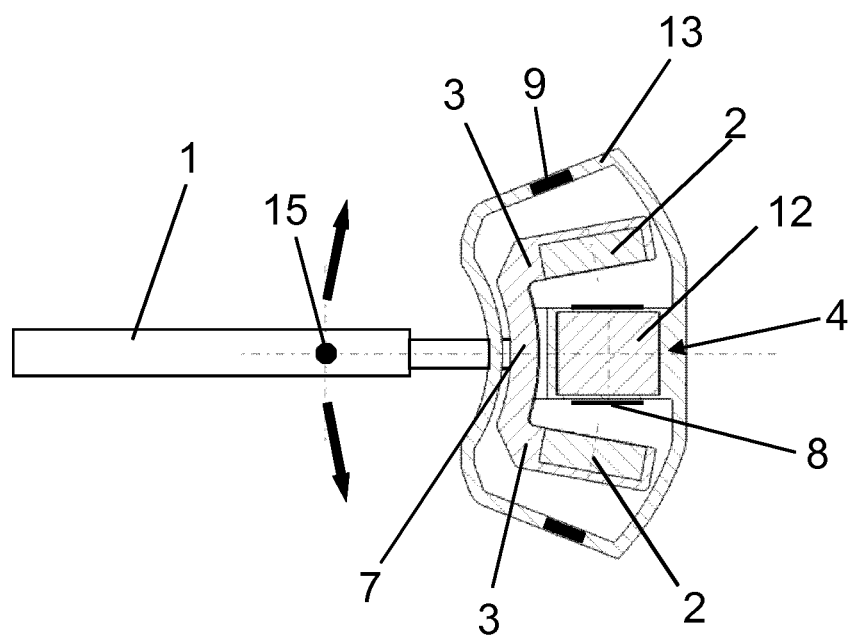
FIGS. 2, 3, and 4 each illustrate a schematic view of a mechanism for locking and releasing a switching lever of the steering column switch in different actuating positions.
Figure 3:
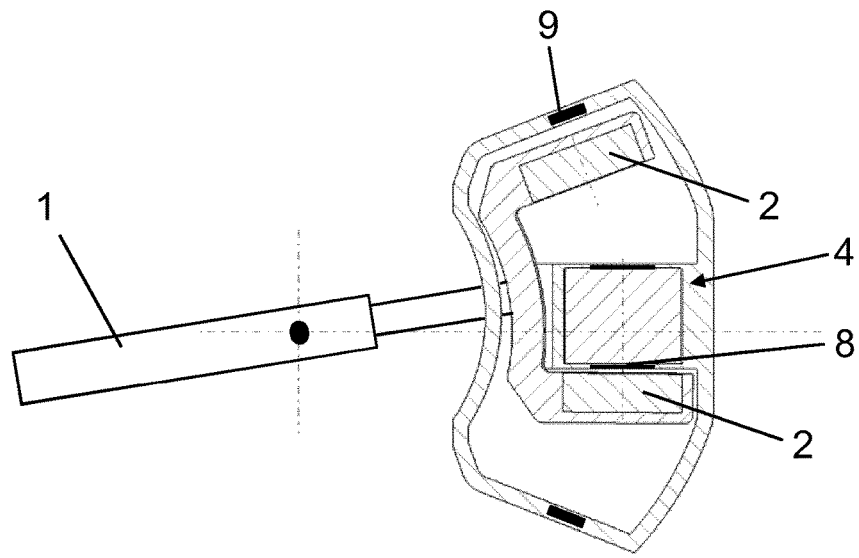
Figure 4:
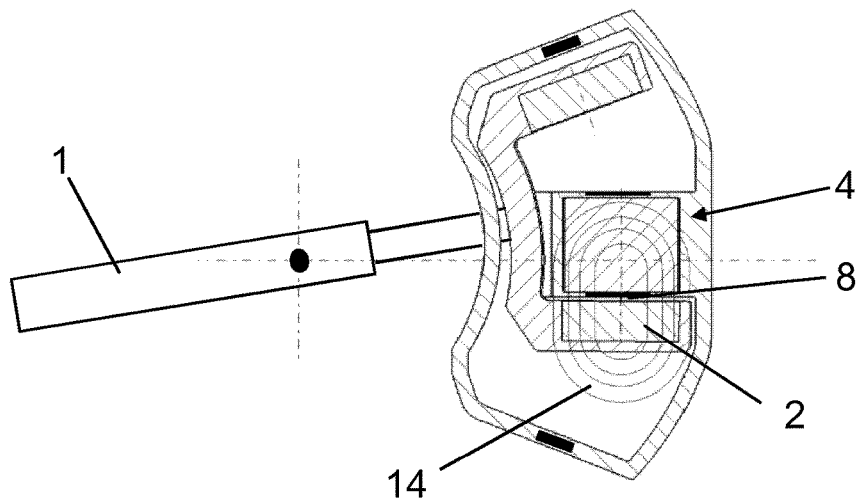

For these purposes, the steering column switch provides a simple mechanism. The simple mechanism is explained with the schematic illustrations in FIGS. 2, 3, and 4. As described, switching lever 1 is mechanically coupled to switch body 7. Switch body 7 is pivotable with respect to a stationary (i.e., fixed) housing part 13 of housing 10 by actuating switching lever 1. Switch body 7 together with switching lever 1 has the shape of a two-armed fork having fork arms 3. A permanent magnet 2 is situated on one of the fork arms 3 and another permanent magnet is situated on the other one of the fork arms 3.

An electromagnet 4 is fixedly mounted on housing part 13 of housing 10. Electromagnet 4 is situated in the middle between fork arms 3 of switch body 7. Electromagnet 4 includes a solenoid 12 and a coil bobbin 8. Coil bobbin 8 protrudes from both ends of solenoid 12. The end-face surfaces of coil bobbin 8 are respectively oriented toward permanent magnets 2. Coil core 8 is made of a ferromagnetic material. Solenoid 12 of electromagnet 4 is situated exactly in the middle between fork arms 3 of switch body 7 when switching lever 1 is not actuated.

When switching lever 1 is pivoted into one of the two actuating directions, the permanent magnet 2 on the corresponding fork arm 3 of switch body 7 contacts an end-face surface of coil bobbin 8. The corresponding fork arm 3 of switch body 7 is held in place as the permanent magnet 2 is held on coil bobbin 8 by the magnetic force of the permanent magnet 2. This results, for example, in the arrangement illustrated in FIG. 3, in which switching lever 1 is held in the most recently set switch position.

To release the permanent magnet 2 from coil bobbin 8, and thereby to release switching lever 1 from being held in the most recently set switch position, electromagnet 4 is supplied with current to generate a magnetic field that interrupts and/or counteracts the magnetic attraction between the permanent magnet 2 and coil bobbin 8. Electromagnet 4 may be supplied with the current by an electronic control device (not shown). The magnetic field generated by electromagnet 4 counteracts the magnetic field of the permanent magnet 2 and compensates for same as well as possible. An opposing magnetic field 14 generated by electromagnet 4 is indicated by field lines in FIG. 4. As illustrated, the field lines extend through electromagnet 4 and through the permanent magnet 2 contacting coil bobbin 8 of the electromagnet.

When the two oppositely acting, magnetic fields are sufficiently compensated for, the return effect of switch gate 11 predominates. This returns switching lever 1, and thus switch body 7 connected thereto, to its starting position illustrated in FIG. 2.

The switch position of switching lever 1 may advantageously be detected in a contactless and wear-free manner by one or more magnetic sensors 9 situated on respective positions of housing part 13. The magnetic field strengths detected by magnetic sensors 9 are an unequivocal function of the positions of permanent magnets 2 relative to housing part 13, and thus, of the instantaneous switching lever position that is present.

LIST OF REFERENCE NUMERALS 1 switching lever
2 permanent magnet(s)
3 first and second fork arms
4 electromagnet
5 locking pin
6 contour of the switch gate
7 switch body (switching piece)
8 coil core or coil bobbin (magnetic retaining element) of the electromagnet
9 magnetic sensor
10 switching lever housing
11 switch gate
12 solenoid of the electromagnet
13 housing part 14 opposing magnetic field
15 pivot axis While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A steering column switch for a vehicle, comprising:
a housing having a switch gate;
a switching lever being actuatable by pivoting with respect to the housing, the switching lever having a locking pin guided on the switch gate, the locking pin assuming a stable switch position on the switch gate when the switching lever is not actuated, the locking pin being guided into an unstable switch position by actuating the switching lever, wherein the switch gate is configured to return the locking pin from the unstable switch position into the stable switch position after actuation of the switching lever is discontinued;
a switch body connected to the switching lever to pivot with the switching lever in relation to the housing, the switch body having a permanent magnet;
an electromagnet fixed within the housing, the electromagnet having a magnetic retaining element;
wherein the permanent magnet is brought against the magnetic retaining element by pivoting the switching lever into the unstable switch position and the switching lever is held in the unstable switch position for a period, during which a function associated with the switching lever being actuated into the unstable position is active, by magnetic attraction between the permanent magnet and the electromagnet; and
wherein upon expiration of the period the electromagnet is controlled into a switched-on state to generate an opposing magnetic field interrupting the magnetic attraction between the permanent magnet and the electromagnet so that the switching lever is returned by the switch gate from the unstable switch position back to the stable switch position.

2. The steering column switch of claim 1 further comprising:
a magnetic sensor fixed to a part of the housing, the magnetic sensor configured to generate an output signal as a function of a position of the permanent magnet relative to the part of the housing.

3. The steering column switch of claim 1 wherein:
the magnetic retaining element includes a ferromagnetic material.

4. The steering column switch of claim 1 wherein:
the magnetic retaining element is a permanent magnet.

5. The steering column switch of claim 1 wherein:
the magnetic retaining element is a coil core of the electromagnet.

6. The steering column switch of claim 1 wherein:
the steering column switch forms a blinker switch for a motor vehicle.

7. The steering column switch of claim 1 wherein:
the steering column switch forms a windshield wiper switch for a motor vehicle.

8. A steering column switch for a vehicle, comprising:
a housing having a switch gate;
a switching lever actuatable by being pivotable with respect to the housing, the switching lever having a locking pin;
the switch gate configured to have the locking pin assume a stable switch position when the switching lever is not actuated, guide the locking pin from the stable switch position to a first unstable switch position when the switching lever is actuated in a first direction, guide the locking pin from the stable switch position to a second unstable switch position when the switching lever is actuated in a second direction, and return the locking pin from either unstable switch position to the stable switch position when actuation of the switching lever is discontinued;
a switch body having a first arm with a first permanent magnet and a second arm with a second permanent magnet, the switch body connected to the switching lever to pivot with the switching lever in relation to the housing;
an electromagnet fixed to the housing; and
wherein the first permanent magnet is brought against the electromagnet by the switching lever being actuated to pivot into the first unstable switch position and the switching lever is held in the first unstable switch position for a first period, during which a first function associated with the switching lever being actuated into the first unstable position is active, by magnetic attraction between the first permanent magnet and the electromagnet, wherein upon expiration of the first period the electromagnet is controlled into a switched-on state to generate an opposing magnetic field interrupting the magnetic attraction between the first permanent magnet and the electromagnet so that the switching lever is returned by the switch gate from the first unstable switch position back to the stable switch position.

9. The steering column switch of claim 8 wherein:
the second permanent magnet is brought against the electromagnet by the switching lever being actuated to pivot into the second unstable switch position and the switching lever is held in the second unstable switch position for a second period, during which a second function associated with the switching lever being actuated into the second unstable position is active, by magnetic attraction between the second permanent magnet and the electromagnet, wherein upon expiration of the second period the electromagnet is controlled into a switched-on state to generate an opposing magnetic field interrupting the magnetic attraction between the second permanent magnet and the electromagnet so that the switching lever is returned by the switch gate from the second unstable switch position back to the stable switch position.

10. The steering column switch of claim 8 further comprising:
a first magnetic sensor fixed to a first part of the housing, the first magnetic sensor configured to generate an output signal as a function of a position of the first permanent magnet relative to the first part of the housing; and
a second magnetic sensor fixed to a second part of the housing, the second magnetic sensor configured to generate an output signal as a function of a position of the second permanent magnet relative to the second part of the housing.

* * * * *